(12) United States Patent
Odland et al.

(10) Patent No.: US 8,471,404 B2
(45) Date of Patent: Jun. 25, 2013

(54) SYSTEM AND METHOD FOR SUPPORTING HIGH BURST CURRENT IN A CURRENT LIMITED SYSTEM

(75) Inventors: Keith Odland, Austin, TX (US); Brent Wilson, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 809 days.

(21) Appl. No.: 12/570,088

(22) Filed: Sep. 30, 2009

(65) Prior Publication Data

US 2011/0062785 A1  Mar. 17, 2011

Related U.S. Application Data

(60) Provisional application No. 61/243,002, filed on Sep. 16, 2009.

(51) Int. Cl.
*H02J 7/34* (2006.01)
*H02J 1/10* (2006.01)
*H02J 1/00* (2006.01)

(52) U.S. Cl.
USPC .............................................. 307/52; 307/71

(58) Field of Classification Search
USPC ........................................................ 307/52, 71
See application file for complete search history.

(56) References Cited

U.S. PATENT DOCUMENTS

| 7,705,560 | B2 * | 4/2010 | Johnson ........................ 320/117 |
| 2009/0167260 | A1 * | 7/2009 | Pauritsch et al. ............. 323/233 |

* cited by examiner

*Primary Examiner* — Rexford Barnie
*Assistant Examiner* — Dru Parries
(74) *Attorney, Agent, or Firm* — Trop, Pruner & Hu, P.C.

(57) ABSTRACT

A current limited system for providing a burst current capability comprises a variable load having a first mode of operation requiring a first current level and a burst current mode of operation requiring a second current level. The second current level is greater than the first current level. A control processor provides control signals for the current limited system. A voltage source is connected to the variable load to provide a source current. The source current provides the variable load the first current level in the first mode of operation. A burst mode circuit provides the second current level to the variable load in the burst current mode of operation, responsive to the control signals from the control processor and the voltage source.

15 Claims, 7 Drawing Sheets

SYSTEM AND METHOD FOR SUPPORTING HIGH BURST CURRENT IN A CURRENT LIMITED SYSTEM

CROSS-REFERENCE TO RELATED APPLICATIONS

This application claims priority to U.S. Provisional Patent Application No. 61/243,002, filed Sep. 16, 2009, entitled SYSTEM AND METHOD OF SUPPORTING HIGH BURST CURRENTS IN LIMITED CURRENT SYSTEM, all of which is incorporated herein by reference.

TECHNICAL FIELD

The present invention relates to current limited devices, and more particularly, to a system and method for supporting periodic high burst current requirements within a current limited device.

BACKGROUND

Various devices that are remotely located for different types of monitoring functions often have various power, voltage, and current needs depending on the state of operation of the device. For example, wireless meters that monitor power, water, gas, or other types of utilities are being implemented by various utility companies. With these types of devices, a customer's use of utilities may be remotely monitored rather than requiring onsite monitoring. The electronic components within these systems can have various power, voltage and current requirements depending upon whether the device is merely in a low powered monitoring state or is in a higher power data transmission state wherein the information that is being monitored by the device is being transmitted to some centralized location.

Within these types of devices, the ability for limiting power, voltage or current use can greatly extend the life of the device. One problem within these types of devices is that they are often current limited applications in the majority of their operating cycle. However, there are limited periods of time wherein high burst current conditions occur and additional operating current levels are needed to charge or operate various states of the device.

Another problem with these types of devices often arises in the voltage needs that are normally associated therewith. Many devices will often operate much more efficiently when in a very low power, low voltage state of operation. However, certain operations within the device may require higher voltage in order to operate more efficiently. In various applications, the product service life dictates the battery chemistry. The battery chemistry dictates the battery voltage. The battery voltage dictates the power consumption. Many times the voltage is higher than it needs to be for the circuitry required in the system so the entire system does not operate as efficiently at it otherwise can. This may require design of the device to meet the high power applications that are only used at a very limited period of time in the operation of the device.

Thus, some control means and/or systems for overcoming these types of limitations within existing control topologies would greatly benefit the operation of differing types of remote metering/remote monitoring applications.

SUMMARY

The present invention as disclosed and described herein in one aspect thereof comprises a current limited system for providing a burst current capability. A variable load has a first mode of operation requiring a first current level and a burst current mode of operation requiring a second current level. The second current level is greater than the first current level. A control processor provides control signals for the current limited system. A voltage source is connected to the variable load to provide a source current. The source current provides the variable load the first current level in the first mode of operation. A burst mode circuit provides the second current level to the variable load in the burst current mode of operation, responsive to the control signals from the control processor and the voltage source.

BRIEF DESCRIPTION OF THE DRAWINGS

For a more complete understanding, reference is now made to the following description taken in conjunction with the accompanying Drawings in which.

DETAILED DESCRIPTION

Figure 1A:
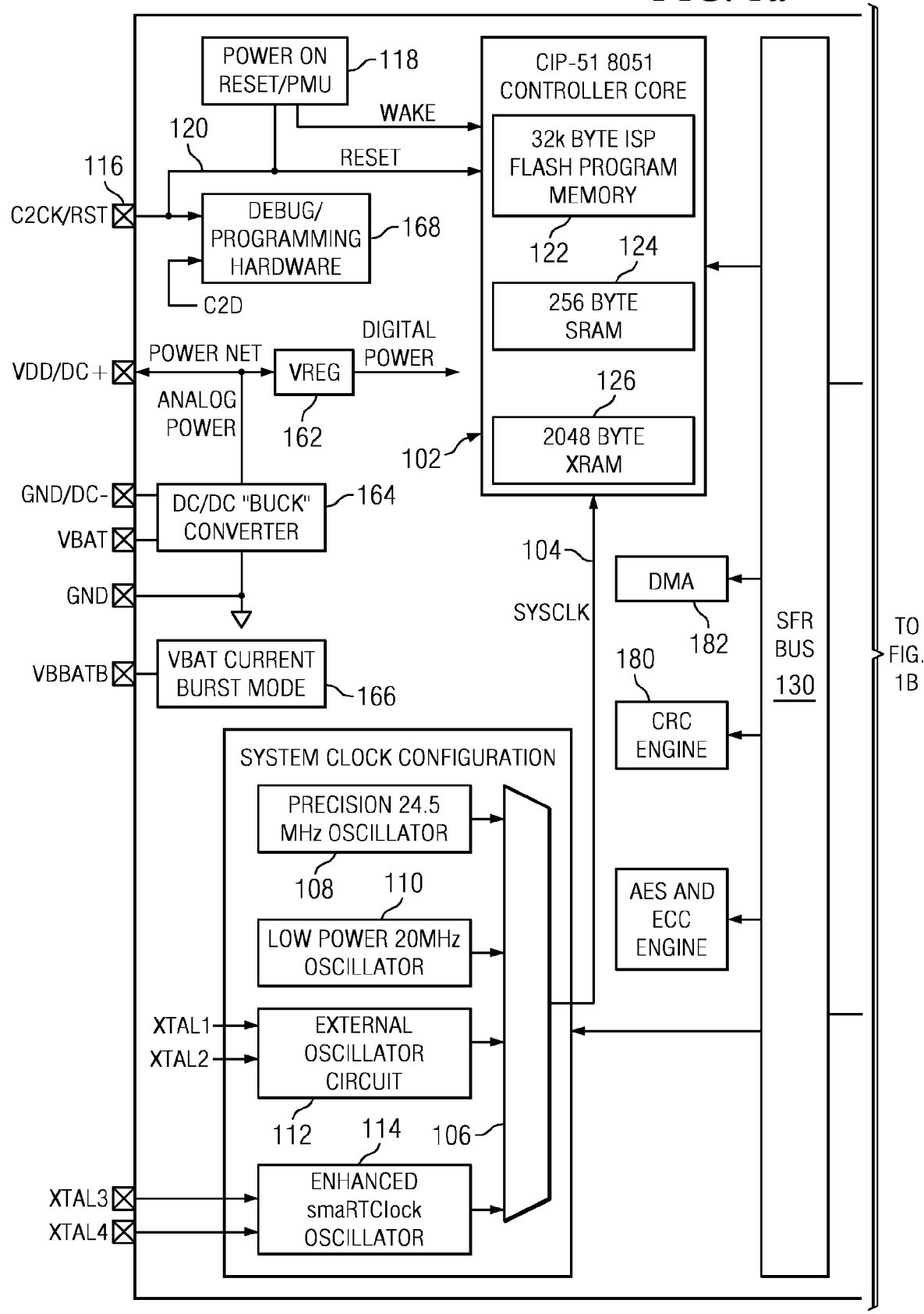
FIG. 1 is a block diagram of a microcontroller unit for use with a system providing support for high burst currents in a current limited applications.

Referring now to the drawings, wherein like reference numbers are used herein to designate like elements throughout, the various views and embodiments of a system and method for supporting high burst current in a current limited system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1B:
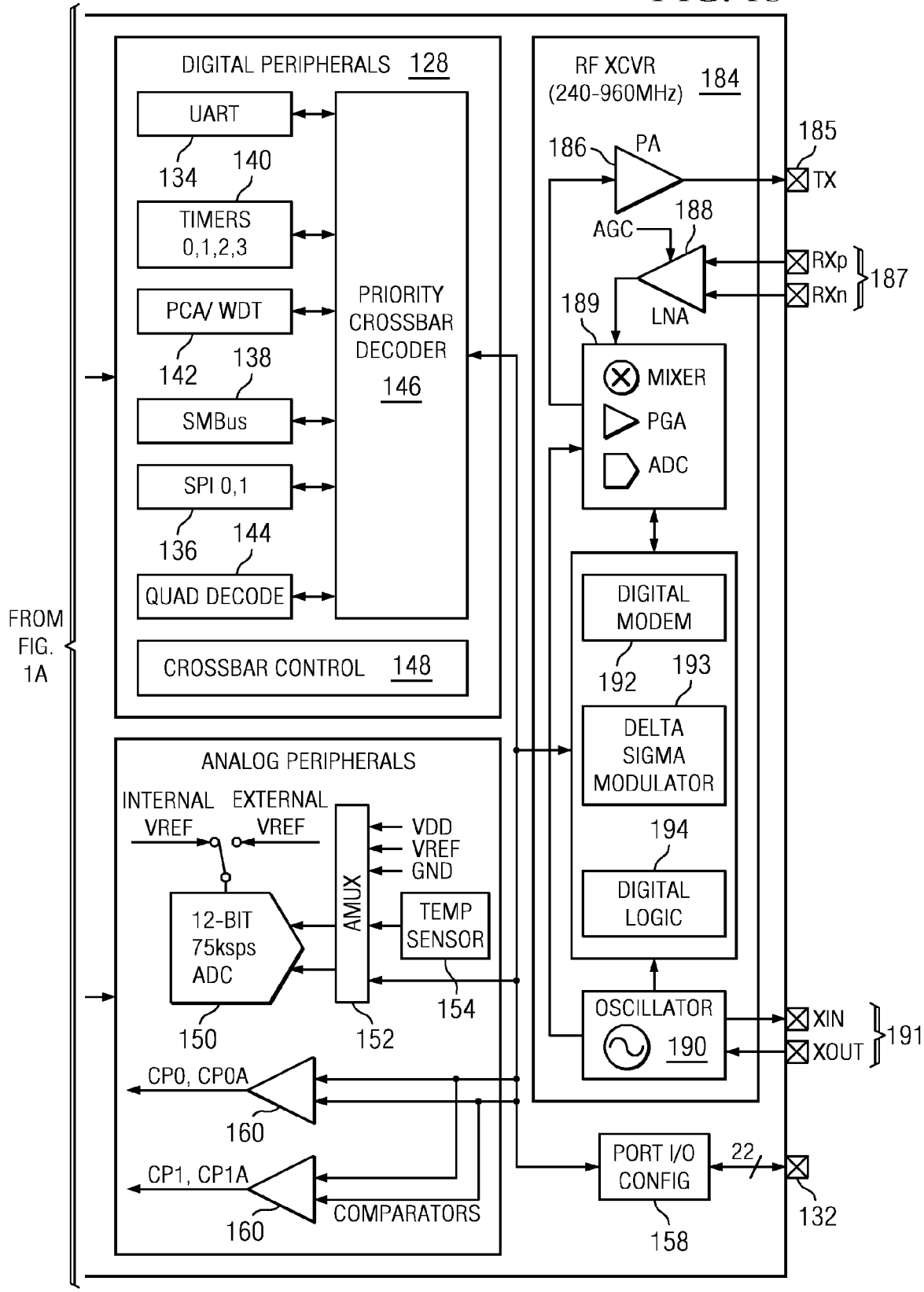

Referring now to the drawings, and more particularly to FIG. 1, there is illustrated a block diagram of a microcontroller unit (MCU) 100 that may be useful for controlling both systems that support temporary high burst currents in normally current limited applications and that may assist in providing dynamically regulated voltage to minimize power consumption. FIG. 1 illustrates a block diagram of an MCU 100. The MCU 100 is generally of the type similar to part number C8051F940, manufactured by Silicon Laboratories Inc. The MCU 100 includes a processing core 102 which is typically comprised of a conventional microprocessor of the type "8051." The processing core 102 receives a clock signal on a line 104 from a multiplexer 106.

The multiplexer 106 is operable to select among multiple clocks. There is provided a 24.5 MHz trimmable internal precision oscillator 108, a low power 10 MHz oscillator 110, an external crystal controlled oscillator circuit 112, and a real time clock oscillator 114. The precision internal oscillator 108 is described in U.S. Pat. No. 7,395,447, entitled "PRECISION OSCILLATOR FOR AN ASYNCHRONOUS TRANSMISSION SYSTEM," issued Jul. 1, 2008, which is incorporated herein by reference. The processing core 102 is also operable to receive an external reset on terminal 116 or is operable to receive the reset signal from a power on reset/power management unit block 118, each of which provide a reset to the processing core 102 on line 120.

The processing core 102 has associated therewith a plurality of memory resources, those being a flash memory 122, SRAM memory 124 or random access memory 126. The processing core 102 interfaces with various digital peripherals 128 to an on-board SFR bus 130 which allows the processing core 102 to interface with various I/O pins 132 that can interface external to the chip to receive digital values, output digital values, receive analog values or output analog values. Various digital I/O circuitries are provided, these being serial port interface circuitry, such as a UART 134, a SPI circuit 136 or a SMBus interface circuit 138. Four timers 140 are also provided. A PCA/WDT (watch dog timer) 142 provides wave form generation functions. A quad decoder 144 additionally provides counting a quadrature decoding function.

All of this circuitry 134-144 is interfaceable to the I/O pins 132 through a crossbar switch 146 which is operable to configurably interface these devices with select ones of the I/O pins 132 responsive to control inputs from a crossbar control block 148. The crossbar control block 148 is configured by the processing core 102. The digital inputs/outputs can also be interfaced to the digital output of an analog-to-digital converter 150 that receives analog input signals from an analog multiplexer 152 interfaced to a plurality of the I/O pins 132 on the integrated circuit. The analog multiplexer 152 allows for multiple outputs to be sent through pins 132 such that the ADC 150 can be interfaced to various sensors including a temperature sensor 154. The other side of the crossbar switch 146, the I/O side, is interfaced with various support drivers which are controlled by the port I/O configuration block 158 that interfaces with the bus 130. A pair of programmable comparators 160 may also utilize the I/O pins 132.

The RF transceiver block 184 enables transmission and reception of data from the MCU in a 240 to 960 MHz range. Transmission pin 185 is connected to the output of a transmission driver 186. Receive pins 187 are connected to the inputs of a differential receiver 188. A mixer circuit, programmable amplifier and ADC circuitry 189 are connected to the output of the receiver driver 188 and the input of the transmission driver 186. This circuitry is used for modulating or demodulating the transmitted and received signals received or transmitted on pins 185 and 187. An oscillator circuit 190 provides the modulation signals necessary for operating the mixer circuitry 189. The frequency of the oscillator 190 can be programmed via control pins 191. Modulation and demodulation of signals within the RF transceiver 184 can be controlled by a digital modem 192, a delta signal modulator 193 and other digital logic 194. The operation of the RF transceiver circuitry 184 often requires the need for higher operating voltages and burst currents as will be more fully described herein below.

A voltage regulator 162 is connected to receive analog power over the $V_{DD}$/DC+pin and generates a regulated digital power signal for the digital components of the MCU 100 at the output thereof. A DC/DC buck regulator 164 may act as a step-down voltage converter within the device to provide a lower regulated voltage that would provide a more efficient mode of operation for certain operating conditions of the MCU 100 and associated components. The buck regulator 164 may also be used for providing regulated power to other devices external from the MCU. $V_{BAT}$ current burst mode block 166 controls when the MCU 100 can provide a burst current in a peak load operating condition. A debug/programming hardware block 168 enables for programming of internal components in the MCU.

Additionally connected to the SFR bus are a CRC (cycle redundancy check) block 180 and a DMA (Direct Memory Access) block 182 assists in reducing overall system power consumption by either moving data from location to location in parallel with the CPU activity so that the overall active time is reduced or by performing a data move function more efficiently than the CPU such that the CPU can be halted thereby reducing power consumption. The DMA block 182 is implemented in a general purpose manner so that starting points and destination can be in the SFR and XRAM memory space. It will have four channels and support chaining The DMA block 182 is useable when the processing core 102 is in sleep mode.

Figure 2:
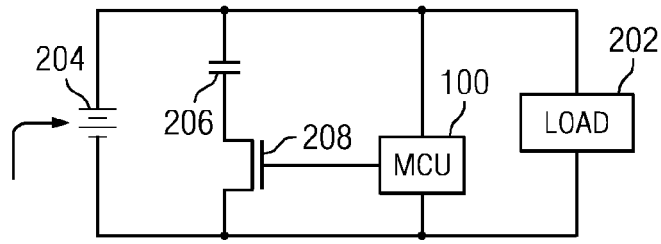
FIG. 2 illustrates a first embodiment for supporting a burst current within a current limited application.

Referring now to FIG. 2, there is illustrated one embodiment of a manner for utilizing the MCU 100 to support a high burst current in a normally current limited application. The ability to enter the mode of operation supporting the high burst current is enabled through the VBBATB pin associated with the $V_{BAT}$ current burst mode block 166 described previously with respect to FIG. 1. When the current burst mode block 166 is enabled, the MCU 100 provides control signals and/or charging voltages for charging a capacitor 206 that is used for providing the additional currents necessary to support the high burst currents within a current limited application.

In the application of FIG. 2, a load 202 comprises a variable duty cycle load such as a radio transmitter. The load 202 normally only requires a limited current supply from the voltage source 204 which comprises a battery. When the load 202 enters a high current use application requiring a burst of current supply from the voltage source 204, the situation arises where the peak load current necessary to support the load 202 can not be sufficiently provided for by the battery voltage source 204. In this case, a capacitor 206 placed in parallel with the voltage source 204 may discharge a stored voltage to the load 202. A switch consisting of an N-channel switching transistor 208 is connected between the capacitor 206 and ground. In the implementation of FIG. 2, the gate of the N-channel switching transistor 208 is connected to receive control signals from the MCU 100. When the transistor 208 is turned on, and the capacitor 206 is connected to ground, the capacitor will charge to a voltage level equal to the voltage level of the battery voltage source 204. Since the capacitor will initially look like a short to the battery voltage source 204, an intelligent charging algorithm implemented within the MCU 100 is used to charge the capacitor 206 without making the voltage of the battery drop below a specific threshold. Once the voltage of the capacitor 206 equals the voltage of the battery voltage source 204, the capacitor is ready to provide a burst current to the load 202. When the load 202 presents itself (e.g., a radio transmission is started), the burst current is supplied by the battery voltage source 204 and the capacitor 206. Once the load 202 is removed (e.g., the radio transmission is completed), the capacitor 206 is disconnected from the battery to minimize the leakage current through the capacitor 206. The decision to add and remove the capacitor from the system to support burst mode currents and reduce capacitor leakage will depend on factors such as load duty cycle, maximum load, capacitor leakage which are monitored by the MCU 100.

Figure 3:
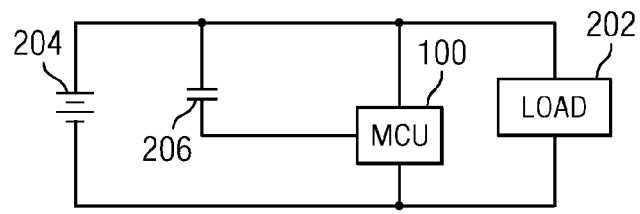
FIG. 3 illustrates an alternative embodiment for supporting burst currents within a current limited application.

Referring now also to FIG. 3, there is illustrated an alternative embodiment for implementing the parallel capacitor design described with respect to FIG. 2. In this case, the capacitor 206, rather than being connected to ground through the switching transistor 208, is connected directly to the MCU 100. The MCU 100 connects the capacitor 206 to ground to charge it up to a voltage equal to the voltage being provided by the voltage source 204. An intelligent charging algorithm implemented within the MCU 100 is used to charge the capacitor 206 without making the voltage of the battery drop below a specific threshold. Once the voltage of the capacitor 206 equals the voltage of the battery voltage source 204, the capacitor is ready to provide a burst current to the load 202. When the load 202 presents itself (e.g., a radio transmission is started), the burst current is supplied by the battery voltage source 204 and the capacitor 206. Once the load 202 is removed (e.g., the radio transmission is completed), the capacitor 206 is disconnected from the battery to minimize the leakage current through the capacitor 206. The decision to add and remove the capacitor from the system to support burst mode currents and reduce capacitor leakage will depend on factors such as load duty cycle, maximum load, capacitor leakage which are monitored by the MCU 100.

Figure 4A:
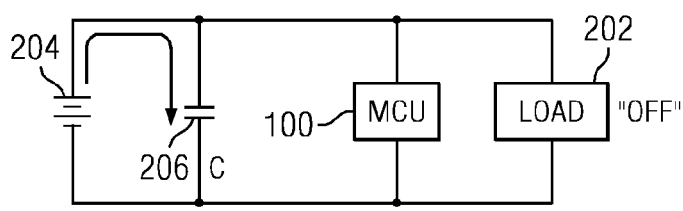
FIG. 4a illustrates a simplified schematic diagram illustrating when the simplified burst current process is implemented to charge a burst load capacitor.
Figure 4B:
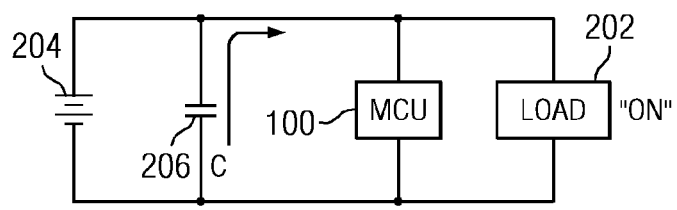
FIG. 4b illustrates a simplified schematic diagram illustrating a burst current supplied responsive to a connected load.
Figure 5:
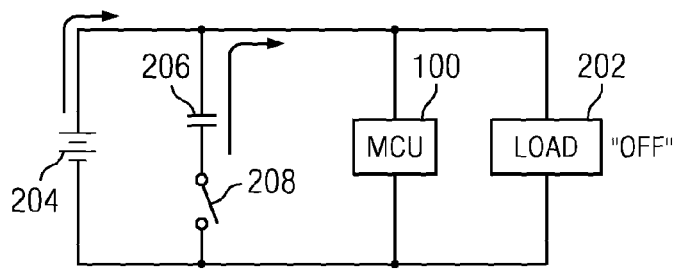
FIG. 5 illustrates a simplified schematic block diagram illustrating a configuration of the system when the burst current capabilities are not needed.

Referring now to FIGS. 4a and 4b, there are illustrated the two states of operation of the circuit described with respect to FIG. 2. FIG. 4a illustrates when the switching transistor 208 is closed and in a charging mode of operation and the load 202 is not connected. In this case, the voltage provided from the voltage source 204 charges a voltage onto capacitor 206 equal to the voltage provided across the terminals of the voltage source 204. Next, as illustrated in FIG. 4b, when the load 202 is connected to the circuit a need for a burst current arises. This causes the capacitor 206 to discharge its voltage into the load 202 and an additional current to be provided from the capacitor 206 in addition to any current provided from the voltage source to the load 202. The intelligent charging algorithm implemented within the MCU 100 is used to charge the capacitor 206 without making the voltage of the battery drop below a specific threshold. When the load 202 presents itself, the burst current is supplied by the battery voltage source 204 and the capacitor 206. When the load 202 is removed, the capacitor 206 is disconnected from the battery to minimize the leakage current through the capacitor 206 as illustrated in FIG. 5. The decision to add and remove the capacitor from the system to support burst mode currents and reduce capacitor leakage will depend on factors such as load duty cycle, maximum load, capacitor leakage which are monitored by the MCU 100. The capacitor is disconnected from the battery by opening the switch 208 to disconnect the capacitor 206 from ground.

Figure 6:
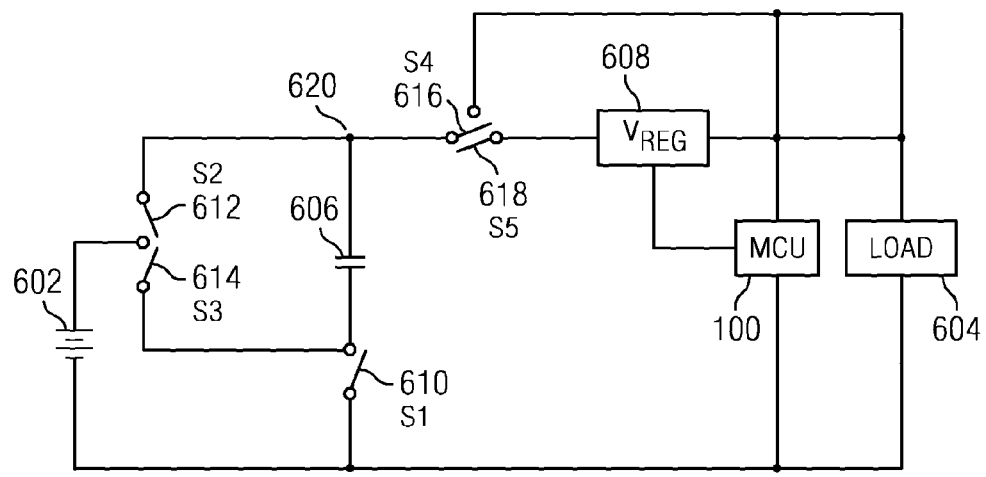
FIG. 6 illustrates yet another embodiment for providing burst current capabilities within a current limited system.

Referring now to FIG. 6, there is illustrated an alternative embodiment of a manner for providing a burst current to a variable duty cycle load of a low current application. In this embodiment, the voltage source 602 providing the voltage source to the variable duty cycle load 604 has a capacitor 606 associated therewith. The capacitor 606 may be connected in series with the voltage source 602 when a burst current is needed, in parallel with the voltage source 602 when the capacitor 606 is being charged or in a standby mode where the battery is connected to the load 604 when no burst current is needed. Also connected to the capacitor 606 between the capacitor and the variable duty cycle load 604 is a voltage regulator 608. The voltage regulator 608 may either boost or drop the voltage provided from the voltage source 602 and capacitor 606 that is output to the variable duty cycle loads 604. The operation of the voltage regulator 608 is controlled by the microcontroller unit 100 described herein above with respect to FIG. 1. The output to the voltage regulator 608 would be provided from the MCU 100 via any one of its I/O pins 132.

A number of switches 610-618 are used for selectively connecting the capacitor in series with the battery, in parallel with the battery or in the standby mode as mentioned above. Switch 610 is connected between the capacitor 606 and ground. Switch 612 is connected between the voltage source 602 and node 620. Switch 614 is connected between the voltage source 602 and ground. Switch 616 connects node 620 directly to the load 604 and switch 618 connects node 620 to the voltage regulator 608. The presently described switching configuration for connecting the capacitor in series with the battery, in parallel with the battery or in the standby mode comprises merely one configuration and other embodiments may be used.

When in the standby mode no burst current is needed from the capacitor 606. The switches S1 610 and S3 614 are open while switches S2 612 and S4 616 are closed. This connects the voltage source 602 directly to the load 604 through node 620. When in a pre-charge mode to charge the capacitor 606. Switch S1 610, switch S2 612 and switch S4 616 are closed while switch S3 614 is opened. This configuration connects the voltage source 602 to the load 604 and connects the capacitor 606 in parallel with the voltage source 602. This allows the capacitor to charge up to a predetermined level. Since the capacitor will initially look like a short to the voltage source 602, an intelligent charging algorithm implemented within the MCU 100 is used to charge the capacitor 606 without making the voltage of the battery drop below a specific threshold. Once the voltage of the capacitor 606 equals the voltage of the battery voltage source 602, the capacitor is ready to provide a burst current to the load 604. To provide the burst current, switch S1 610 and switch S2 612 are opened while switches S3 614 and S4 616 are closed. This places the voltage source 602 in series with the capacitor 606 and the burst current is provided from the combined voltages of the voltage source and the capacitor. Switch S5 618 can be closed with switch S4 616 opened if the stack voltage of the voltage source 602 and the capacitor 606 is greater than the load 604 can tolerate.

The voltage source 602 charges the capacitor to a predetermined voltage level based upon the size of the capacitor 606. The higher voltage level represented by the battery voltage plus the voltage stored on capacitor 606 is regulated by the voltage regulator 608 to supply a peak load current to the variable load 604. The capacitor 606 is charged to a voltage level that is approximately equal to the voltage level that is required for the load 604 to operate. The series combination of voltages from the voltage source 602 and capacitor 606 will discharge to the battery when the load 604 is removed. The voltage regulator 608 may comprise an LDO regulator or a buck converter regulator.

Figure 7:
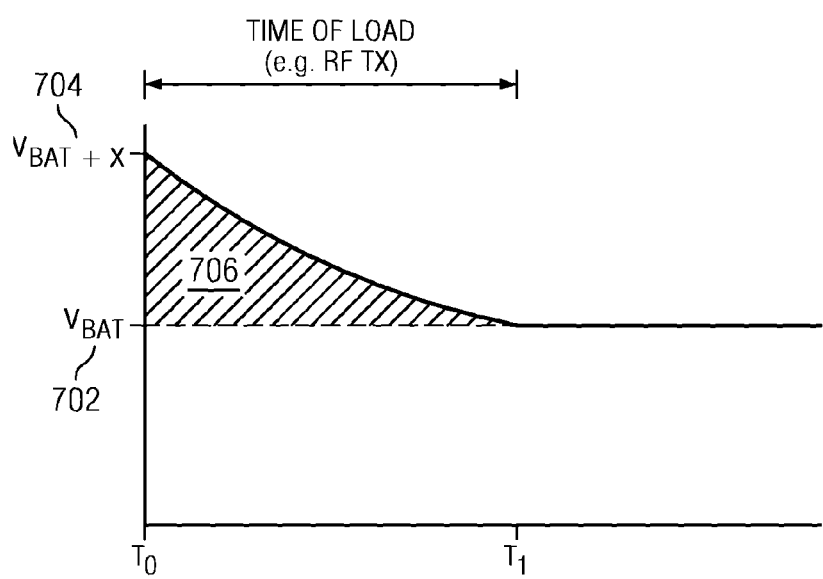
FIG. 7 illustrates the manner in which an increased source voltage is provided to a peak load condition within a current limited device.

Referring now to FIG. 7, there is illustrated a diagram of the manner in which the additional current necessary to support the burst current is discharged to support peak load conditions of the variable duty cycle load 604. The level $V_{BAT}$ 702 represents the voltage level provided to the load by just the battery source. The level $V_{BAT}$+X 704 represents the additional voltage level provided by the addition of the capacitor 606 in series with the voltage source 602. From time $T_0$ to time $T_1$, representing the time that the peak load conditions are required by the load 604, i.e., such as if RF transmissions were being carried out, the voltage drops from the level 704 down to the level 702. The shaded area 706 represents the charge depleted from the capacitor that is used for supporting the peak load and providing the burst current necessary for operation of the load.

Figure 8:
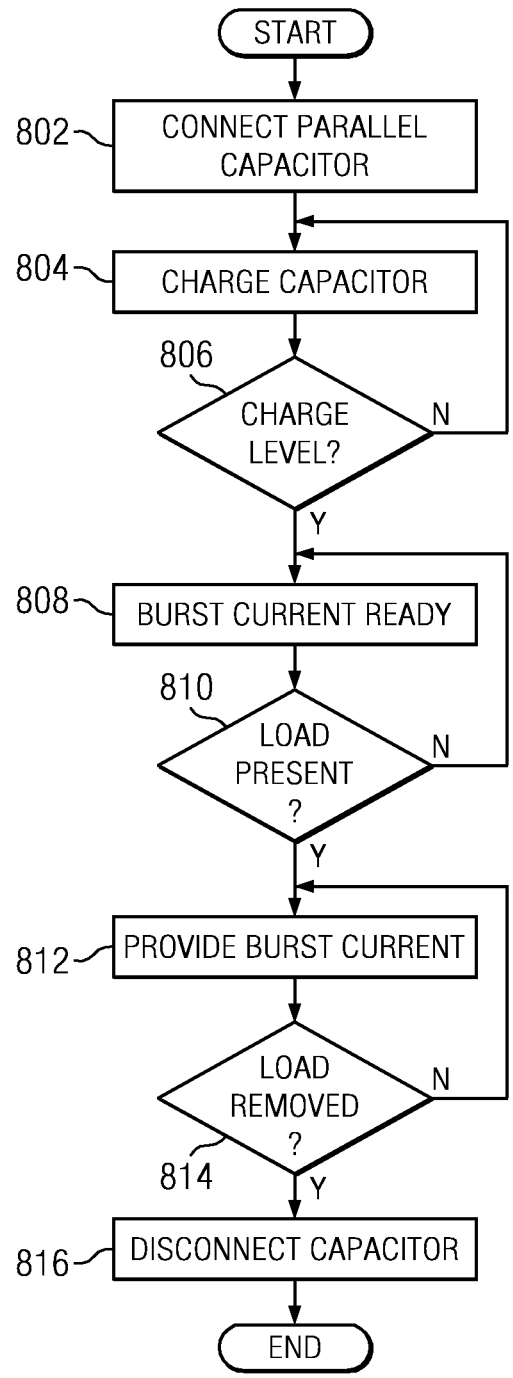
FIG. 8 is a flow diagram describing the operation of the embodiments of FIGS. 2 and 3.

Referring now to FIG. 8, there is a flow diagram illustrating the operation of the embodiment of FIG. 5. Once the process is initiated, the capacitor connected in parallel with the voltage source 204 is connected to ground at step 802. This initiates a charging of the capacitor at step 804 by the voltage source 204. Inquiry step 806 determines if the capacitor is charged up to a voltage that does not cause the source voltage 204 to drop below a predetermined level. If the capacitor has not reached the charge level control passes back to step 804 to continue charging the capacitor 206. Once the capacitor reaches the predetermined level as determined by the used charging algorithm, the capacitor is ready to provide the burst current at step 808. Inquiry step 810 determines whether the load requiring the burst current is present. If the load is not present, control passes back to step 808. When the load is present, the burst current is provided by both the battery and the capacitor at step 812. This additional current plus the current provided by the voltage source 204 enables the peak load requirements of the load 202 to be met. The burst current is continuously provided until inquiry step 814 determines that the load has been removed. Once the load is removed, the capacitor 206 is disconnected from the battery at step 816 to minimize leakage currents through the capacitor. If the load has not been removed, the burst current is still provided at step 812. The process is then completed and the capacitor may be recharged as necessary.

Figure 9:
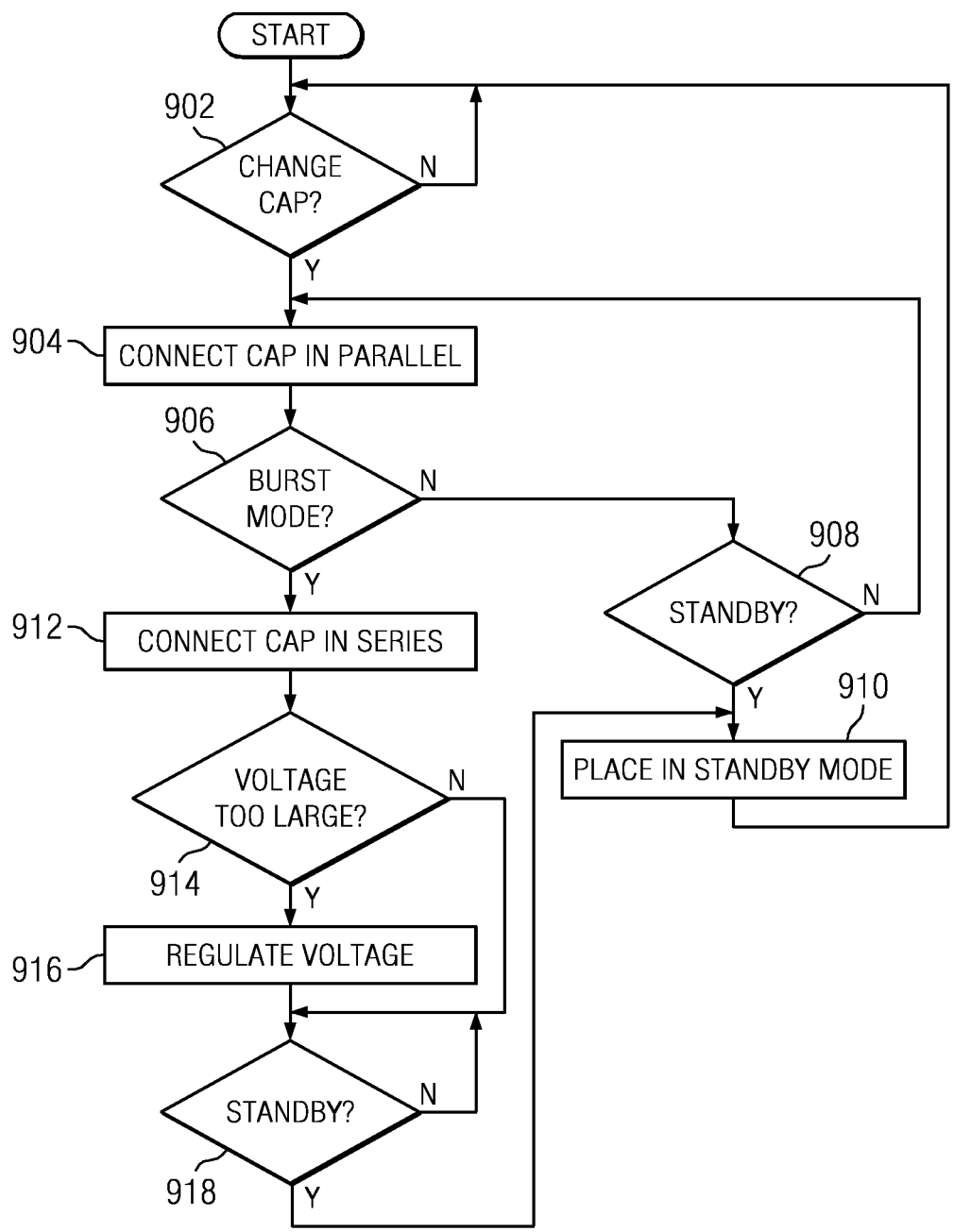
FIG. 9 is a flow diagram describing the operation of the embodiment of FIG. 6.

Referring now to FIG. 9, there is a flow diagram illustrating the operation of the burst current configuration of the device of FIG. 6, wherein a capacitor 606 may be either placed in parallel with or stacked on top of a voltage source 602 and may be applied through a voltage regulator 608. Once the process is initiated, inquiry step 902 determines if the capacitor 606 needs to be charged. If not, inquiry step 902 may continue monitoring. If inquiry step 902 determines that the capacitor needs to be charged, the capacitor 606 is connected in parallel with the voltage source at 904 in order to enable charging of the capacitor. Inquiry step 906 then determines whether the system is in the burst current mode of operation. If not in burst current mode, control passes to inquiry step 908 to determine if the system needs to enter the standby mode of operation. If not in standby mode, control passes back to step 904. If the device does need to enter the standby mode of operation, the switches of the circuit of FIG. 6 are placed in the standby mode at step 910.

If inquiry step 906 determines that the system is in the burst current mode of operation, the capacitor 606 is placed in series with the voltage source 602 at step 912. This enables a provision of the burst current to the load by the combined voltage of the voltage source 602 and the capacitor 606. Inquiry step 914 determines if the combined voltage is too large. If so, the voltage is regulated at step 916 by the voltage regulator circuit 608 by closing switch 618 and opening switch 616. If the voltage is not too large or once the voltage is being regulated at step 916, inquiry step 918 determines if the system is in the standby mode of operation. If not in stand by mode, inquiry step 918 continues to monitor for the standby mode. Once the system enters the standby mode of operation, the capacitor and system are placed in the standby mode at step 910. Control may then pass back to step 902 to determine if the capacitor needs to be recharged.

Figure 10:
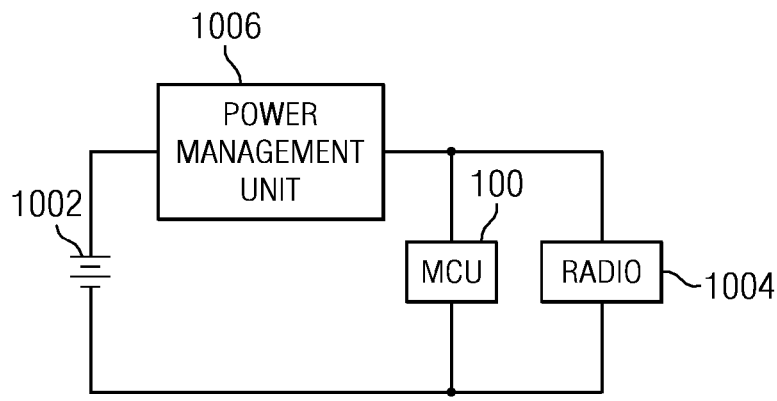
FIG. 10 illustrates a simplified block diagram for dynamically regulating the input voltage to minimize power consumption.

Referring now to FIG. 10, there is illustrated an alternative configuration for use of the MCU 100 of FIG. 1. The MCU 100 and a battery voltage source 1002 are connected with a radio transmitter 1004. The radio transmitter 1004 requires the full voltage provided by the battery voltage source 1002 in order to operate at peak efficiency. However, the MCU 100 operates more efficiently at a lower voltage level than that required by the transmitter 1004. For example, in a metering application that uses a 3.6 volt battery source 1002, the radio transmitter 1004 requires the full 3.6 volt battery voltage to operate at peak efficiency. However, when the radio transmitter 1004 is turned off, the MCU 100 will operate more efficiently at 1.8 volts. Thus, there is a need to be able to operate over a range of voltages between 1.8 volts and 3.6 volts.

In order to overcome this problem a power management unit 1006, which may comprise a buck/boost switching regulator is placed between the battery voltage source 1002 and the MCU 100 and radio transmitter 1004. The power management unit 1006 can reduce the system voltage provided by the battery 1002 such that the MCU 100 operates more efficiently when the 3.6 volt rail is not needed to operate the radio transmitter 1004. However, when the radio transmitter 1004 is necessary for operation of the circuit, the power management unit will boost the voltage from the battery 1002 back up to the 3.6 volt rail level. The power management unit 1006 will thus regulate the voltage to the lowest possible operating level when a higher operating voltage is not required. The power management unit 1006 may also regulate the voltage to any level with in the desired voltage range. The power management unit 1006 may comprise a buck/boost switching regulator. When the system voltage requirements are higher, due to the use of a radio transmitter 1004 or some other type of associated circuitry, the power management unit 1006 may be disabled to only provide the unregulated battery voltage level 1002 or, alternatively, may be placed in a boost mode of operation to provide a voltage greater than that provided by the battery voltage source. While the present description has been made with respect to a radio transmitter component 1004, the circuit is operable with any situation wherein the components operating with the MCU 100 require a higher voltage than is necessary for maximum operating efficiency of the MCU 100.

Figure 11:
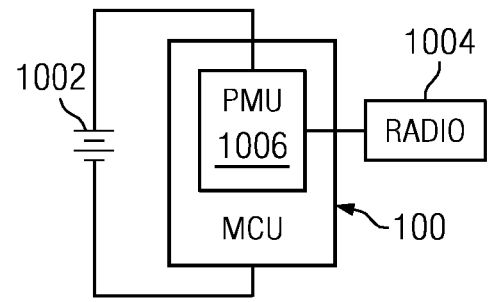
FIG. 11 illustrates an alternative embodiment of a system for dynamically regulating the input voltage to minimize power consumption.

Referring now to FIG. 11, the power management unit 1006, which comprises a buck/boost switching regulator residing external of the MCU 100, may be internally integrated within the MCU 100 to provide the voltage regulation between the voltage source 1002, the MCU 100 and the external radio transmitter or other type of similar component 1004. The power management unit 1006 may comprise one of or both of the DC/DC buck regulator 164 or voltage regulator 162, described previously with respect to FIG. 1. The operation of the circuit would be the same as that described with respect to FIG. 10.

Figure 12:
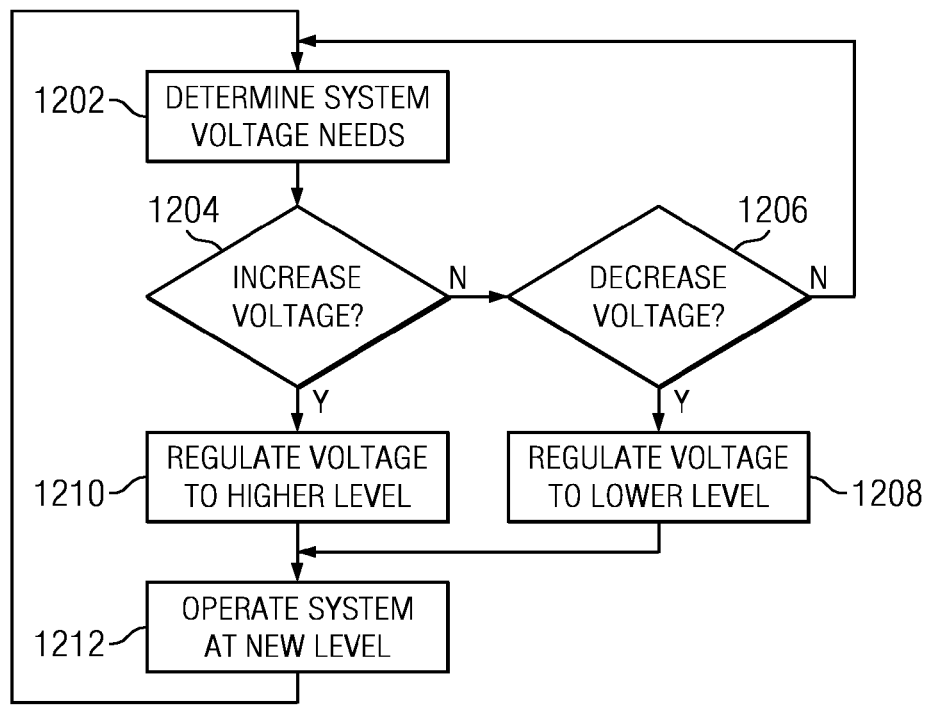
FIG. 12 is a flow diagram describing the operation of the system for dynamically regulating voltage to minimize power consumption.

The operation of the circuit of FIGS. 10 and 11 is more fully illustrated in the flow diagram of FIG. 12. The system power needs are determined at step 1202 by the MCU 100.

This involves determining whether the presently operating components only require a lower voltage to operate the system most efficiently or whether a higher voltage is necessary. Inquiry step 1204 determines if the present voltage needs of the system require an increase in the system voltage. If not, inquiry step 1206 determines whether a decrease in the system voltage is necessary. If no decrease or increase in power is required, the system returns back to step 1202 to again update the system voltage needs. If inquiry step 1206 determines that a decrease in the system voltage is needed, the voltage from the battery is regulated to a lower voltage level at step 1208. The system is then operated at the new system voltage level at step 1212.

If inquiry step 1204 determines that an increase of power is necessary, the system voltage is regulated to the higher level at step 1210. This may involve disabling the voltage regulator as described previously to provide the system battery voltage to the system or initiating a boost mode of operation within the voltage regulator to increase the regulated voltage. Once the voltage has been increased to the necessary level, the system is operated at the new level at step 1210. Control will then pass back to step 1202 to again update the system voltage needs.

It will be appreciated by those skilled in the art having the benefit of this disclosure that this system and method for supporting high burst current in a current limited system provides the ability to meet boost current requirements in a current limited application. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system comprising:
   a variable load having a first mode of operation requiring a first current level and a burst current mode of operation requiring a second current level, wherein the second current level is greater than the first current level;
   a control processor for providing control signals;
   a voltage source connected to the variable load for providing a source current, the source current providing the load the first current level in the first mode of operation;
   a burst mode circuit for providing the second current level to the variable load in the burst current mode of operation, responsive to the control signals from the control processor and the voltage source, comprising:
      a capacitor connected in parallel across the voltage source;
      circuitry for connecting the capacitor to ground responsive to the control signals; and
      wherein the circuitry connects the capacitor to ground in the first mode of operation responsive to the control signals causing the capacitor to charge to a voltage level provided by the voltage source and the circuitry in the second mode of operation causes a discharge of the voltage level on the capacitor and a generation of a boost current that is combined with the source current from the voltage source to generate the second current level to the variable load responsive to the control signals, the control signals further to disconnect the capacitor from ground responsive to removal of the variable load.

2. The system of claim 1, wherein the circuitry comprises:
   a switch connected between the capacitor and ground; and
   wherein the switch is closed in the first mode of operation responsive to the control signals causing the capacitor to charge to a predetermined voltage level responsive to the voltage source and responsive to the variable load in the second mode of operation causing the discharge of the voltage level on the capacitor and the generation of the boost current.

3. The system of claim 2, wherein the control processor further includes a control algorithm for charging the capacitor to the predetermined voltage level that does not cause the voltage source to drop below a threshold level.

4. The system of claim 3, wherein the switch comprises an N-channel transistor.

5. The system of claim 1, wherein the capacitor having a first plate connected to the voltage source and a second plate connected to the control processor.

6. The system of claim 1, wherein the burst mode circuit further comprises:
   a plurality of switches associated with the capacitor;
   a voltage regulator responsive to the control signals connected between the capacitor and the variable load; and
   wherein during the first mode of operation the plurality of switches are configured to connect the capacitor in parallel with the voltage source to charge the capacitor to a predetermined voltage level; and
   wherein during the burst current mode of operation the plurality of switches are configured to connect the capacitor in series with the voltage source to provide a combined voltage of the predetermined voltage level and a source voltage provided by the voltage source to provide the second current level.

7. The system of claim 6, wherein the combined voltage is regulated to a voltage level by the voltage regulator in response to the control signals to the predetermined voltage level to provide the second current level.

8. The system of claim 6, wherein during a standby mode of operation the plurality of switches are configured to connect the voltage source directly to the variable load and disconnect the capacitor from the system.

9. The system of claim 1, wherein the current burst mode of operation is initiated responsive to the system transmitting RF signals from at least a portion of the variable load.

10. A method comprising:
    generating control signals from a processor to operate a system in a first mode of operation requiring a first current level and in a burst current mode of operation requiring a second current level;
    providing a source current from a voltage source to a variable load at the first current level responsive to control signals indicating the first mode of operation;
    generating the second current level responsive to the control signals from the processor and the source current from the voltage source, including closing a switch to connect a capacitor in parallel across the voltage source to ground in the first mode of operation responsive to the control signals, charging the capacitor to a voltage level provided by the voltage source while the capacitor is connected to ground in the first mode of operation, discharging the voltage level on the capacitor to generate a boost current in the second mode of operation responsive to the control signals, and combining the boost current with the source current from the voltage source to generate the second current level;

providing the second current level to the variable load in the burst current mode of operation; and disconnecting the capacitor from ground through the processor in the second mode of operation responsive to the control signals responsive to removal of the variable load.

11. The method of claim 10, wherein the closing further comprises turning on an N-channel transistor.

12. The method of claim 11, further comprising turning off the N-channel transistor.

13. The method of claim 10, wherein generating the second current level further comprises:

connecting the capacitor in parallel with the voltage source in the first mode of operation;

charging the capacitor to a predetermined voltage level;

connecting the capacitor in series with the voltage source in the burst current mode of operation; and providing a combined voltage from the voltage source and the charge on the capacitor to provide a current at the second current level during the burst current mode of operation.

14. The method of claim 13, further comprising regulating the combined voltage provided from the voltage source and the charge on the capacitor to provide the current at the second current level during the burst current mode of operation responsive to the control signals from the processor.

15. The method of claim 13, further comprising placing the capacitor into a standby mode of operation.

* * * * *